C. M. HARRINGTON.
ANIMAL TRAP.
APPLICATION FILED SEPT. 29, 1911.
1,029,992.
Patented June 18, 1912.
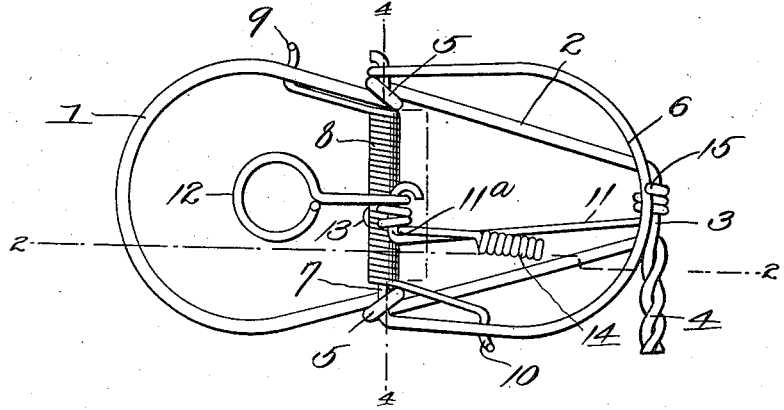
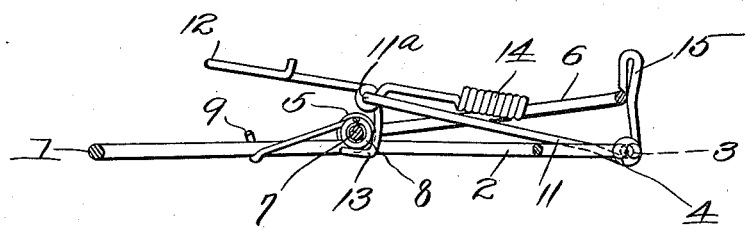
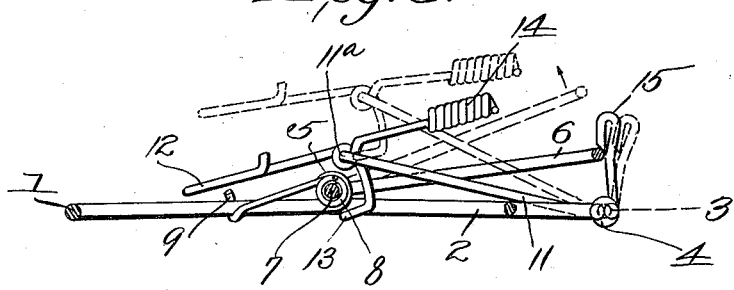
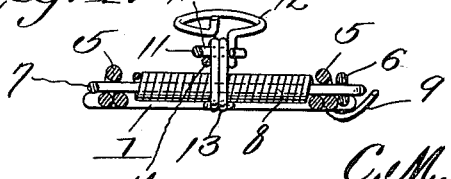
WITNESSES
Oliver W. Holmes
E. Everett
INVENTOR
C. M. Harrington
By
Attorney

UNITED STATES PATENT OFFICE.

CLYDE M. HARRINGTON, OF CHRISMAN, ILLINOIS.

ANIMAL-TRAP.

1,029,992.  Specification of Letters Patent.  Patented June 18, 1912.

Application filed September 29, 1911. Serial No. 651,995.

*To all whom it may concern:*

Be it known that I, CLYDE M. HARRINGTON, citizen of the United States, residing at Chrisman, in the county of Edgar and State of Illinois, have invented certain new and useful Improvements in Animal-Traps, of which the following is a specification.

The present invention relates to certain new and useful improvements in animal traps of that general character which comprise spring jaws adapted to be released by a treadle mechanism and grip some portion of the animal.

The object of the invention is to provide an improved trap of this character which is simple and inexpensive in its construction, which is positive and reliable in its action, and which can be set without the necessity of inserting the hand of the operator between the jaws for the purpose of adjusting the treadle.

A still further object of the invention is to provide a trap which embodies novel features of construction whereby the treadle mechanism has a smooth and easy action and operates freely without any binding or catching of the parts.

With these and other objects in view, the invention consists in certain novel combinations and arrangements of the parts as will more fully appear as the description proceeds, the novel features thereof being pointed out in the appended claims.

For a full understanding of the invention, reference is to be had to the following description and accompanying drawings, in which:—

Figure 1 is a top plan view of a trap constructed in accordance with the invention, the movable jaw of the trap being shown in an open or set position. Fig. 2 is a longitudinal sectional view on the line 2—2 of Fig. 1. Fig. 3 is a similar view, the parts being shown in full lines in the position assumed when the treadle is moved downwardly to spring the trap, and in dotted lines in the position assumed upon the initial movement of the spring jaw, and Fig. 4 is a transverse sectional view on the line 4—4 of Fig. 1.

Corresponding and like parts are referred to in the following description and indicated in all the views of the drawing by the same reference numerals.

Referring to the drawing, the numeral 1 designates the fixed jaw of the trap, and 2 an extension projecting rearwardly from the fixed jaw and integral or rigid therewith. Both the fixed jaw and the extension are in substantially the same plane and form a frame adapted to rest upon the ground or any other suitable support. The fixed jaw and extension may be conveniently formed from a single piece of wire, as indicated upon the drawing, the middle portion of the wire being suitably looped to provide the fixed jaw and the ends thereof being extended rearwardly to provide the extension. A short cross bar 3 connects the converging sides of the extension 2 at the end of the extension, and the extremities of the wire are twisted together and extended laterally as indicated at 4. A pair of pivot eyes 5 project upwardly from the rear end of the fixed jaw 1 upon opposite sides thereof, and these eyes may be conveniently formed by suitably looping the wires. The movable jaw 6 may also be formed by suitably bending a piece of wire, and has substantially the same configuration as the fixed jaw 1 so as to fit tightly against the same when the trap is sprung. This movable jaw is formed with a cross bar 7 which extends through the pivot eyes 5 and constitutes the pivot member of the jaw. A coil spring 8 is fitted upon the cross bar 7, one end of the coil spring being extended laterally and brought into engagement with the fixed jaw 1 as indicated at 9, while the opposite end of the spring is extended laterally and brought into engagement with one side of the movable jaw 6, as indicated at 10. This spring normally tends to swing the movable jaw toward the fixed jaw.

A treadle carrying arm 11 is pivotally mounted upon the cross bar 3 of the frame and extends inwardly toward the coil spring 8, the extremity of the arm being extended laterally at 11ª and having the treadle 12 pivotally mounted thereon. A hook member 13 extends downwardly from the pivot end of the treadle and is adapted to engage the bottom of the spring 8 to hold the arm 11 against upward movement. It will also be observed that the treadle is formed with a rearward extension 14 which is weighted so as to over balance the treadle. This weighted extension has a tendency to move the treadle 12 upwardly until the hook engages the spring. As indicated upon the drawing, the treadle, extension and hook may be conveniently formed from a single piece of wire, the hook 13 being constructed by looping the middle portion of the wire and extending the same downwardly.

A spring hook 15 projects upwardly from the pivot end of the arm 11 and, as indicated in Fig. 2, is adapted to engage the movable jaw 6 when the trap is set.

When an animal depresses the treadle 12, the hook 13 is swung out of engagement with the spring 8. This releases the arm 11 and permits the same to move upwardly until the spring hook has released the movable jaw 6. The spring 8 then swings the movable jaw against the fixed jaw so as to grip any intervening portion of the animal which actuated the treadle. In order to set the trap, the hook member 13 of the treadle is brought into engagement with the spring 8 while the trap is in a closed position. After all of the parts have thus been adjusted, the movable jaw 6 is grasped and swung upwardly and rearwardly into engagement with the spring hook 15. This spring hook will yield a sufficient amount to admit of the movable jaw being brought into engagement with the same, thereby admitting of the trap being set without the necessity of inserting the hands of the operator between the jaws to manipulate the treadle. Attention may also be directed to the fact that the arm 11 gives the treadle hook 13 the advantage of quite a leverage in retaining the spring jaw 6, thereby causing the treadle to operate smoothly without any binding of the parts or undue friction.

Having thus described the invention, what I claim as new and desire to secure by Letters Patent, is:—

1. In a trap, the combination of a frame provided with a fixed jaw, a movable jaw pivoted upon the frame for coöperation with the fixed jaw, a spring for actuating the movable jaw, a treadle carrying arm pivoted upon the frame and provided with a hook member adapted to engage the movable jaw, and a treadle mounted upon the treadle carrying arm and formed with a hook member adapted to engage a fixed portion of the trap.

2. In a trap, the combination of a frame formed with a fixed jaw, a movable jaw pivoted upon the frame for coöperation with the fixed jaw, a spring for actuating the movable jaw, a treadle carrying arm pivoted upon the frame and formed with a spring hook adapted to engage the movable jaw, and a treadle mounted upon the treadle carrying arm for engagement with some fixed portion of the trap, the spring hook member of the treadle carrying arm being adapted to yield a sufficient amount to admit of the movable jaw being forced into engagement therewith after the treadle has been set.

3. In a trap, the combination of a frame formed with a fixed jaw, a movable jaw pivotally mounted upon the frame for coöperation with the fixed jaw, a spring for actuating the movable jaw, a treadle carrying arm pivoted upon the frame and formed with a hook member adapted to engage the movable jaw, and a counter-weighted treadle member mounted upon the treadle carrying arm and formed with a pendent hook member adapted to engage some fixed portion of the trap.

4. In a trap, the combination of a frame formed with a fixed jaw, a movable jaw pivoted upon the frame for coöperation with the fixed jaw, a spring for actuating the movable jaw, a treadle carrying arm pivoted upon the frame and formed at the pivot end thereof with a spring hook member adapted to engage the movable jaw, and a counter balanced treadle mounted upon the free end of the treadle carrying arm, the said treadle being formed with a pendent hook member adapted to engage a fixed portion of the trap and the spring hook of the treadle carrying arm being adapted to yield a sufficient amount to admit of the movable jaw being forced into engagement therewith after the treadle mechanism has been set.

5. In a trap, the combination of a frame formed with a fixed jaw, a movable jaw pivoted upon the frame for coöperation with the fixed jaw and having a cross bar at the pivot end thereof, a spring for actuating the movable jaw, a treadle carrying arm pivoted upon the frame and formed with a hook member adapted to engage the movable jaw, and a treadle mounted upon the free end of the treadle carrying arm and formed with a hook member adapted to extend under the before mentioned bar.

6. In a trap, the combination of a frame formed with a fixed jaw, a movable jaw pivoted upon the frame for coöperation with the fixed jaw and having a cross bar at the pivot end thereof, a spring normally tending to close the jaws, a treadle carrying arm pivoted upon the frame and formed at the pivot end thereof with a spring hook adapted to engage the movable jaw, and a treadle carried by the free end of the treadle carrying arm and formed with a hook member adapted to extend under the before mentioned cross bar, the spring hook of the treadle carrying arm being adapted to yield a sufficient amount to admit of the movable jaw being forced into engagement therewith.

In testimony whereof I affix my signature in presence of two witnesses.

CLYDE M. HARRINGTON.

Witnesses:
J. M. RHOADS,
OTIS CLARK.

Copies of this patent may be obtained for five cents each, by addressing the "Commissioner of Patents, Washington, D. C."